United States Patent

Watts

[15] 3,646,644
[45] Mar. 7, 1972

[54] RELEASABLE STRAP ENCIRCLING MEMBER

[72] Inventor: Wilson J. Watts, Inkster, Mich.
[73] Assignee: Ford Motor Company, Dearborn, Mich.
[22] Filed: June 8, 1970
[21] Appl. No.: 44,372

[52] U.S. Cl. ............................24/114.5, 24/168, 24/170, 297/388, 242/107
[51] Int. Cl. ............................A44b 11/16, A44b 11/06
[58] Field of Search............24/170, 163, 168, 115 H, 255 R; 297/114, 388, 385; 242/107 SB, 107.2, 107

[56] References Cited

UNITED STATES PATENTS

| | | | |
|---|---|---|---|
| 421,133 | 2/1890 | Grierson | 242/107.2 |
| 887,026 | 5/1908 | Barnett | 242/107.2 |
| 1,235,820 | 8/1917 | Leibe | 24/170 |
| 2,622,292 | 12/1952 | Pehaczek | 24/168 |
| 2,650,397 | 9/1953 | Nenser | 24/115.8 H |
| 3,178,222 | 4/1965 | Anderson | 297/385 |
| 3,324,560 | 6/1967 | Snyder | 242/107.2 |

*Primary Examiner*—Bernard A. Gelak
*Attorney*—John R. Faulkner and William E. Johnson

[57] ABSTRACT

This device disables an automatic strap retraction apparatus from retracting a strap from an extended position to an unextended position. This device may be utilized with an automatically retracted seatbelt employed in a motor vehicle. The device includes a member which encircles at least a portion of the strap. The encircling member carries an element which engages the strap in order to lock the encircling member to the strap. A releasing device is provided which cooperates with the engaging element to unlock the element from the strap so that the strap is movable with respect to the strap encircling member.

1 Claims, 8 Drawing Figures

PATENTED MAR 7 1972 3,646,644

INVENTOR
WILSON J. WATTS
BY John R. Faulkner
William E. Johnson
ATTORNEYS

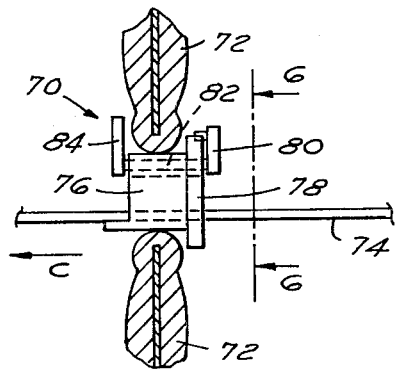
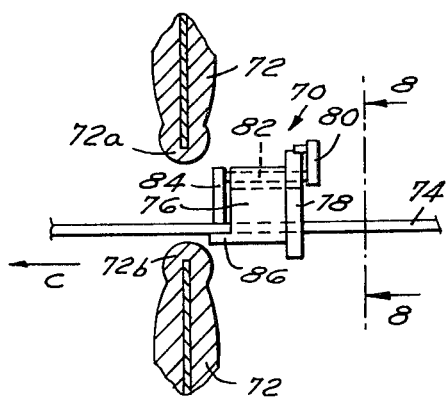
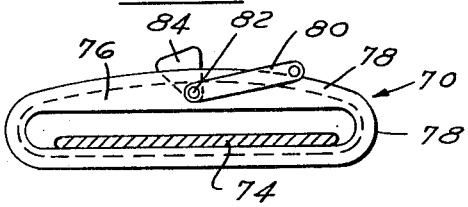
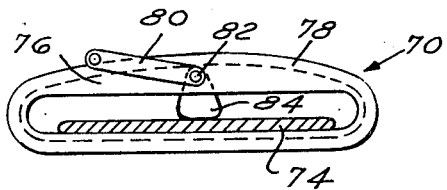

RELEASABLE STRAP ENCIRCLING MEMBER

The strap-encircling member cooperates with a stop member positioned along the path of retraction of the strap by the retracting apparatus. As the retracting apparatus draws the strap along its path of travel to the unextended strap position, the strap-encircling member, locked to the strap by the strap-engaging element, comes into engagement with the stop member to limit further travel of the strap along its retraction path.

BACKGROUND OF THE INVENTION

Most automotive vehicles now carry seatbelts for use of the occupants. In order to make the seatbelts more attractive and to improve the interior appearance of the vehicle, it has become a common expedient to employ seatbelt retracting apparatuses with the seatbelts. These apparatuses retract seatbelts to an unextended position wherein a minimal amount of the seatbelt is exposed. In such a manner, the interior of the vehicle does not look cluttered when the seat belts are not being utilized.

When a vehicle occupant desires to utilize a seatbelt, the belt is withdrawn from the retracting apparatus and fitted about himself. When the seatbelt is in an extended position, the automatic retracting apparatus applies a certain retracting force thereon. When the belt is released by the occupant of the vehicle, the retracting force acting on the belt will automatically retract the belt from the extended position to an unextended position. Since the retracting force acts on the belt at all times, a certain amount of pressure is felt from the belt by the vehicle occupant when the belt is fastened about him.

The device of this invention is intended for use in disabling the retraction of a strap, such as a vehicle seatbelt, into an apparatus which automatically retracts the strap from an extended position to an unextended position. A strap, such as a seatbelt, having a device of this invention in operative association therewith does not apply any significant force or pressure to the occupant of the vehicle confined by the belt. Thus, when the device of this invention is active in disabling the retraction of the seatbelt, the vehicle occupant is more comfortable wearing the belt. The device of this invention may be easily released from engagement with the strap so that the strap can be fully retracted to its unextended position.

SUMMARY OF THE INVENTION

This invention relates to a device for disabling the retraction of a strap and, more particularly, to a device for disabling the retraction of a strap into an apparatus which automatically retracts the strap from an extended position to a unextended position.

In accordance with the teachings of this invention, the disabling device includes a strap-encircling member for overlying at least a portion of the upper and lower surfaces of the strap. A strap-engaging element is carried by the strap-encircling member. This element releasably locks the strap-encircling member to the strap so that the last-mentioned member is movable with the strap. A releasing device cooperates with the strap-engaging element to unlock the element from the strap so that the strap is movable with respect to the strap-encircling member.

In greater detail, the device of this invention includes a stop member positioned along the path of retraction of the strap by the strap-retracting apparatus. The stop member is engageable by the strap-encircling member. When the encircling member is locked to the strap and the encircling member is in engagement with the stop member, the portion of the strap extending beyond the encircling member does not have any significant tension therein. In such a manner, when the extending portion of the strap has no significant tension therein, the occupant of the vehicle wearing the same will not feel any pressure on his body because of the pressure applied to the strap by the strap-retracting apparatus.

BRIEF DESCRIPTION OF THE DRAWING

FIGS. 5 through 8 are various side and elevation views of a third embodiment of the device of this invention.

DESCRIPTION OF THE PREFERRED EMBODIMENT

Figure 1:
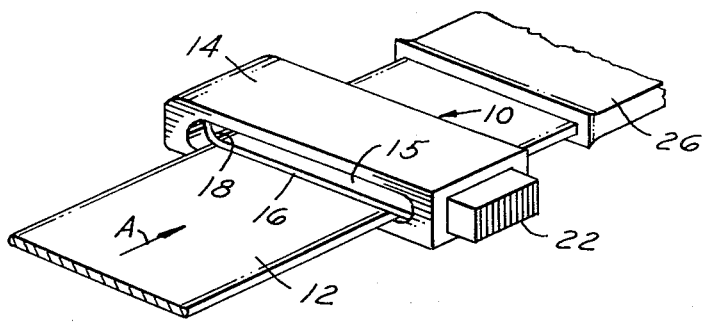
FIGS. 1 and 2 are, respectively, perspective and elevation views of a first embodiment of the device of this invention.
Figure 2:
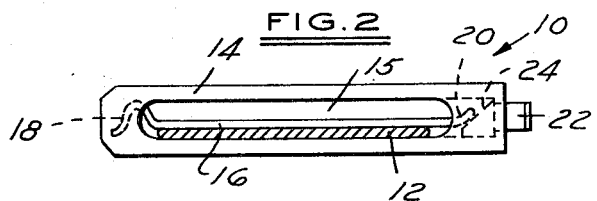

Reference is now made to FIGS. 1 and 2 of the drawings for the description of a first embodiment of a device constructed in accordance with the teachings of this invention. In FIGS. 1 and 2, the device is generally identified by the numeral 10 and is shown as associated with a seatbelt or strap 12. The belt, when not in use, is retracted by an automatic retraction apparatus, not shown, in the direction of arrow A of FIG. 1 from an extended belt position to an unextended belt position.

The retraction disabling device of this invention, in all of its disclosed embodiments, is locked to a seatbelt so that a portion of the belt extends through and beyond the device. The device is brought into engagement with a stop member so that the portion of the belt extending beyond the device is free from any substantial tension. When the portion of the belt extending beyond the device is free from tension, no pressure will be applied to the body of the wearer of the seatbelt.

Again, with reference to FIGS. 1 and 2, the device 10 includes a housing 14 having an opening 15 therein through which the belt 12 extends. A leaf spring 16 has one end 18 thereof secured to the housing and extends from that end along the length of the housing to a free end 20 thereof (FIG. 2). In a normal condition, the leaf spring is flexed into engagement with the strap which passes between the spring and a lower wall of the housing.

A pushbutton 22, having a camming surface 24 (FIG. 2) thereon is mounted for movement in the opening 15 of the housing 14. The camming surface of the button is associated with the free end 20 of the leaf spring 16. The normal force of the leaf spring acting on the camming surface keeps the pushbutton in the position as viewed in FIG. 2.

When an occupant of a motor vehicle desires to remove tension from a seatbelt he desires to utilize, the device of this invention 10 would be positioned in a manner such that it is encircling the belt 12 as is shown in FIGS. 1 and 2. The occupant of the vehicle would initially secure the belt about his person. The occupant would then depress the pushbutton 22 so that the camming surface 24 thereof engages the free end 20 of the leaf spring 16. Such movement causes the leaf spring to move out of engagement with the belt, thereby freeing the device 10 for movement with respect to the belt. With the seatbelt secured about the body of the vehicle occupant, and with the pushbutton of the device depressed, the device is moved along the belt until the housing 14 engages a stop member 26 located along the path of retraction of the seatbelt. In this embodiment, the stop member 26 is in the form of the housing associated with the seatbelt-retracting apparatus (not shown).

When the device 10 is brought into engagement with the stop member 26, the pressure applied by the vehicle occupant is removed from the pushbutton 22 so that the leaf spring 16 once again comes into full contact with the strap 12. Thus, the housing 14 is secured to the strap and the housing is in engagement with the stop member 26. Such engagement of the housing and stop member relieves the tension in the portion of the seatbelt 12 extending outwardly beyond the housing whereby the occupant of the vehicle wearing the belt is freed from the constant pressure of the pulling force applied to the belt by the seatbelt-retracting apparatus.

When it is desired to fully retract the seatbelt 12, the occupant of the vehicle depresses the button 22. The depression of the button, when the seatbelt is not secured about the occupant, moves the leaf spring 16 out of engagement with the belt whereby the housing 14 is unlocked from the belt and the belt is retracted by the retracting apparatus.

Figure 3:
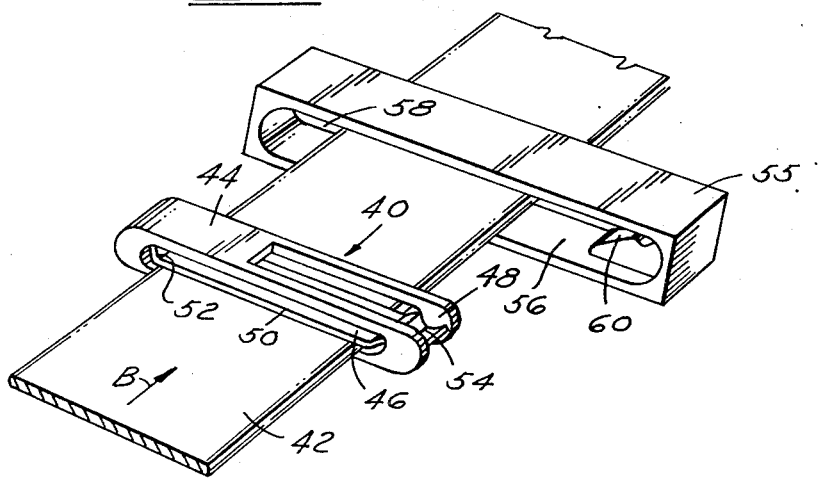
FIGS. 3 and 4 are, respectively, perspective and elevation views of a second embodiment of the device of this invention.
Figure 4:
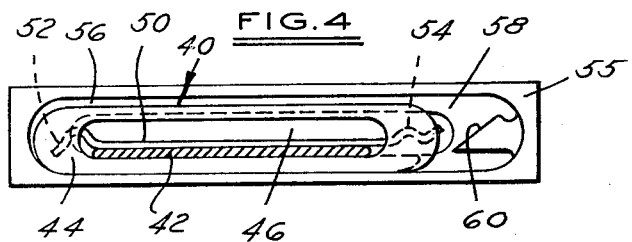

Reference is now made to FIGS. 3 and 4 wherein a second embodiment of the device of this invention, generally identified by the numeral 40, is shown. The device 40 is associated with a seatbelt 42, which belt is retracted in the direction of arrow B of FIG. 3 by an automatic retracting apparatus (not shown). The device includes a housing 44 which encircles the strap. The housing has both an opening 46 through which the strap passes and a secondary opening 48 (FIG. 3) at one end of the housing.

A leaf spring 50 is secured at one end 52 thereof to the housing 44. The leaf spring extends across the length of the opening 46 of the housing and is terminated at a free end 54 which is exposed in the secondary opening 48 (FIG. 3). The leaf spring is normally in engagement with the belt such that the housing is secured to and movable with the belt.

Positioned along the path of retraction of the seatbelt 42 is a stop member 55. This stop member may be formed as a portion of the housing of the belt retraction apparatus. The stop member also may be formed as a separate member which can be secured to the vehicle seat or some other stationary object along the path of retraction of the belt.

The stop member 55 has a large opening 56 therein through which the seatbelt 42 passes. On the side of the stop member 55 opposite the large opening, a stopping surface 58 (best seen in FIG. 4) is provided. The large opening 56 of the stop member receives the housing 44 as the housing is moved to a particular position along the path of travel of the belt as the belt is being retracted. When the housing is received by the stop member, the stopping surface 58 limits any further advance of the housing along the retraction path of the belt.

As best seen in FIG. 4, the opening 56 in the stop member 55 is sufficiently large that the housing 44 is permitted lateral movement therewithin. The side of the opening 55 in the stop member adjacent the free end 54 of the leaf spring 50 supported in the housing is formed so as to have a camming surface 60 thereon. When it is desired to release the housing 44 from the strap 42, the housing is slid laterally along the opening 56 of the stop member until the camming surface 60 enters the secondary opening 48 of the housing. The free end 54 of the leaf spring is then cammed upwardly as it progresses along the camming surface. By such action, the spring tension of the leaf spring is released from the belt and the belt is free to move with respect to the housing. Once the belt is free for movement, the occupant of the vehicle may adjust the strap to the proper position for removing tension therefrom and once again lock the housing to the strap by sliding the free end 54 of the leaf spring off of the camming surface 60.

A third embodiment of the device of this invention is seen in FIGS. 5 through 8 and is generally identified by the numeral 70. In this embodiment, the housing, which is generally locked to the seat belt, may be locked in an inoperative position in which it is not movable with the belt. In FIGS. 5 and 7, there is seen a stop member 72, which member is positioned along the path of retraction of the seatbelt and at least on opposite sides of the seatbelt 74. The stop member has upper and lower extensions 72a and 72b which extend to positions, respectively, in facing relationship with the upper and lower surfaces of the seatbelt.

The device 70 also includes a housing 76 which encircles the seatbelt 74. The housing has a flange 78 thereon, which flange may best be seen in FIGS. 5 and 7. The flange is brought into engagement with the extensions of the stop member 72 when the belt is both locked to the housing and retracted along its path of retraction. The path of retraction of the belt is in the direction of arrow C of FIG. 5.

The housing 76 supports for movement an operating lever 80 which rotates a shaft 82. The shaft 82, in turn, supports a clamping member 84 for movement between two different positions. A first position of the operating lever and the clamping member is illustrated in FIGS. 5 and 6. In this position, the clamping member is pivoted upwardly out of engagement with the belt 74. The clamping member is in contact with the upper extension 72a of the stop member 72 whereby the housing 76 is secured to the stop member. This securement occurs because the clamping member is on one side of the extension 72a of the stop member and the flange 78 of the housing 76 is on the other side of the extension 72a. When the clamping member is in this position, the strap is free for either full retraction by the retraction apparatus or the strap may be moved by the occupant of the vehicle to a desired position.

When the occupant of the vehicle desires to lock the housing 76 to the strap 74, the occupant may do so by pivoting the operating lever 80 to its second position as is illustrated in FIGS. 7 and 8. In the second position, the clamping member 84 is in engagement with the belt to apply pressure between itself and an extension 86 of the housing 76 so as to lock the housing to the belt. In this position the portion of the belt extending out beyond the housing in a direction opposite arrow C no longer has any tension therein. In such a manner, the wearer of the seatbelt may remove the tension from the belt which might otherwise cause him some minor annoyance or discomfort.

There has been disclosed herein three embodiments of a device for disabling the retraction of a strap into an apparatus which automatically retracts the strap from an extended position to a nonextended position. The various embodiments of the device of this invention provide economical and efficient devices for removing tension from a strap such as a seatbelt.

I claim:

1. A device for disabling the retraction of a strap into an apparatus which automatically retracts the strap along a path of retraction from an extended position to an unextended position; which device comprises:

a stop member positioned along the path of retraction by the strap-retracting apparatus;

a housing having a central opening therein encircling the strap in a confining relationship, at least a portion of said housing being engageable with said stop member to limit the movement of said housing along the path of retraction of the strap, said housing also having a secondary opening therein generally perpendicular to said housing's central opening;

a leaf spring having one end thereof secured to said housing and extending across said central opening of said housing at a position placing the strap between said spring and an interior surface of said central opening of said housing, said spring having a terminal end in juxtaposition with said secondary opening in said housing, said spring when in a normal position acting to clamp said strap against said interior surface of said housing; and a depressible member mounted for movement within said central opening of said housing in a direction across the width of the belt, said member having a button portion extending through and outside of said secondary opening in said housing, said member also having a cam surface portion thereon engageable with said terminal free end of said leaf spring whereby depression of said button along said central opening moves said leaf spring out of engagement with the strap so that the strap may be fully retracted by the strap retracting apparatus.

* * * * *